No. 12,717.
REISSUED NOV. 12, 1907.
S. P. STEVENSON.
DOOR AND FRAME THEREFOR FOR OPENING AND CLOSING AIR TIGHT CHAMBERS.
APPLICATION FILED MAR. 10, 1904.
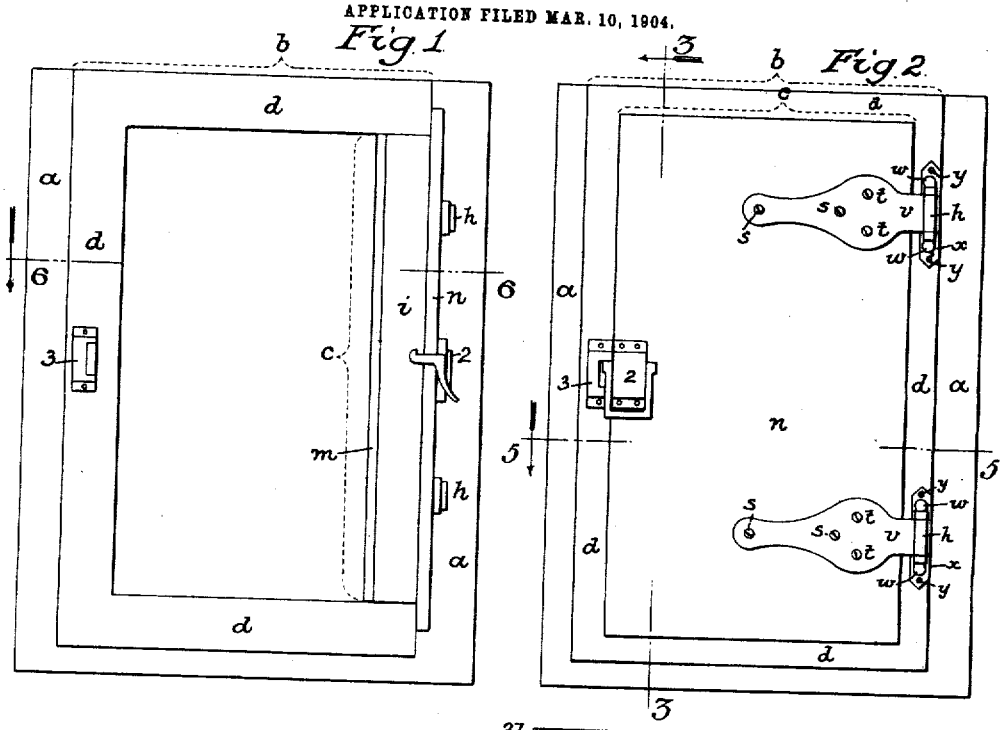
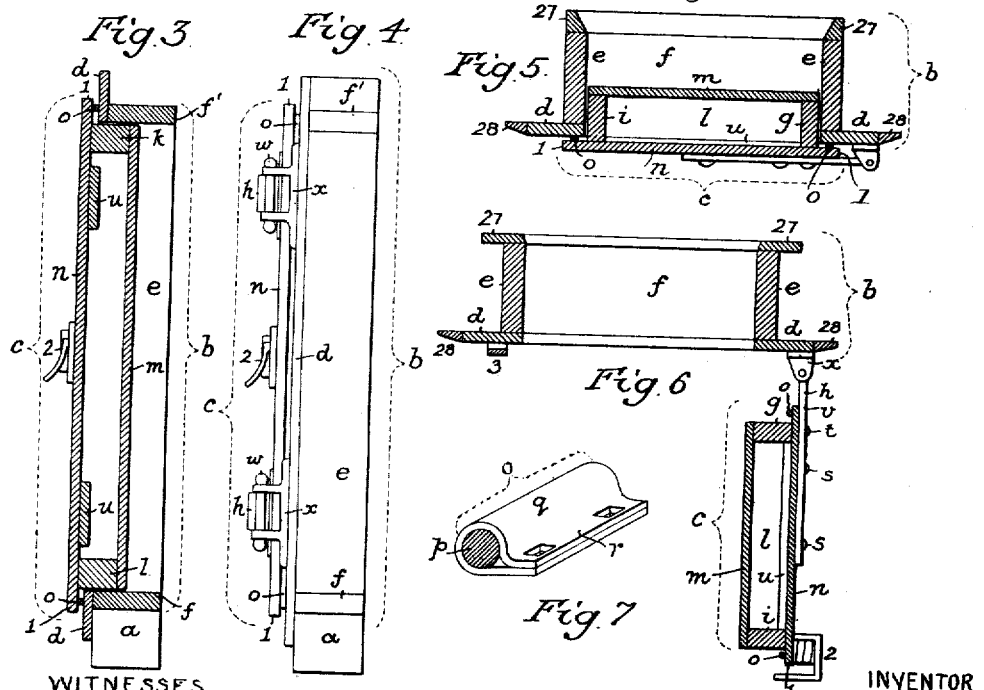
WITNESSES
Augustus B. Coppes
Louis H. Buck.
INVENTOR
S. Price Stevenson,
BY
S. Lloyd Wiegand
ATTORNEY
THE NORRIS PETERS CO., WASHINGTON, D. C.

UNITED STATES PATENT OFFICE.

S. PRICE STEVENSON, OF CHESTER, PENNSYLVANIA.

DOOR AND FRAME THEREFOR FOR OPENING AND CLOSING AIR-TIGHT CHAMBERS.

No. 12,717. Specification of Reissued Letters Patent. Reissued Nov. 12, 1907.

Original No. 697,689, dated April 15, 1902. Serial No. 68,250. Application for reissue filed March 10, 1904. Serial No. 197,602.

*To all whom it may concern:*

Be it known that I, S. PRICE STEVENSON, a citizen of the United States, residing at Chester, Delaware county, Pennsylvania, have invented a new and useful Improvement in Doors and Frames Therefor for Opening and Closing Air-Tight Chambers, of which the following is a specification.

This invention relates to doors and shutters for air-tight chambers, and especially to those required for refrigerators and cold-storage apartments, and embraces the doors and frames therefor and combined with the hinges and latches or locks for connecting and fastening the doors and frames, and has for its object the production of such frames and doors with the connecting parts as a commercially-merchantable article of trade of easy applicability to refrigerating and other chambers required to be air-tight and with a facility of adjustment to automatically compensate for any defects of form that may be developed either in the door or in the wall of the chamber to which the door or frame is applied and facility of closing, latching, and opening that permits such functions with the least care and exertion of force.

The hinges and latches, herein described as combined with the doors and frames, are susceptible of other uses and form the subject of distinct applications for Letters Patent of the United States, numbered 686,989, and 569,394, respectively filed in the 27th, day of July, 1898, and the 19th, day of November, 1895.

To effect these several desiderata, this invention consists in a door having two rigid upright sides or edges united by flexible inside and outside sheathing and upper and lower rails and a frame and casing into which the door fits, said frame and casing being adjustably applicable to door-openings in walls, the whole being arranged and constructed as hereinafter described, and shown in the accompanying drawings, in which—

Figure 1 is a front elevation of a door-frame with the door in open position embodying the invention. Fig. 2 is a front elevation thereof with the door closed. Fig. 3, is a vertical sectional view of said door and frame, taken on the line 3, 3, in Fig. 2. Fig. 4, is a side elevation of said door and frame. Fig. 5, is a horizontal sectional view of said door and frame taken on the line 5, 5, in Fig. 2. Fig. 6, is a horizontal sectional view of said door and frame taken on the line 6, 6, in Fig. 1. Fig. 7 is an enlarged perspective view of a portion of the gasket-packing.

Referring to the drawings, *a* represents the wall of a refrigerating-chamber to which this invention is applied.

*b* is the frame, to which is fitted and hung the door *c*.

*d* is the front casing of the frame *b*, formed of thin boards and transversely flexible.

The frame *b* consists of stiles or jambs *e* and rails or strips forming a lintel *f'* and sill *f*, connecting them. These parts *e*, *f* and *f'* are rigid edgewise and lengthwise, but susceptible of torsionally bending to an extent and for a purpose that will hereinafter appear.

*c* is the door, consisting of an upright *g*, to which the hinges *h* are attached by screws or rivets, and a rigid stile *i*, having the lock and latch 2, attached in like manner. The stiles *g* and *i* are connected at the top and bottom by strips or rails *k* and *l*, as shown in Figs. 3, 5 and 6. The rails *k* and *l* are susceptible of slight torsional flexure. The inner face *m* of the door is formed of sheathing grooved and tongued together so as to be air-tight, and while slightly flexible torsionally, as a plane, is stiff edgewise. The outer face *n* of the door *c* is made to project as a rim 1 over the front casing *d*. It may be made of strips grooved and tongued like the innerface *m* or paneled, according to taste. It should be stiff edgewise and have some flexibility torsionally from the plane surface.

The frame of the door *c*, consisting of the stiles *g* and *i* and strips or rails *k* and *l*, fits easily within the frame *b* and casing *d*. The outer face *n* overlaps the casing *d*, forming a flange or rim 1, and has a gasket *o* attached thereto, which contacting with the casing *d*, seals the joint air-tight. The gasket *o* (shown in Figs. 3, 5, 6 and 7) consists of a soft core *p*, preferably of spun hemp, covered with a flexible fabric or cloth *q*. The edges of the cloth lap upon each other and form a flange *r*, by which it is tacked to the door, so that the elasticity of the core *p* is not obstructed by the tacks. The gasket *o* is compressed and slightly flattened and held clamped between the casing *d* and the rim 1 of the door *c* by the combined action of the hinges *h* and the latch 2, hereinafter described.

The hinges *h*, hereinafter described, are attached to the door *c* by screws *s* and *t*, as shown in Figs. 2, 3, 5 and 6. Horizontal strips *u* are placed in the door *c*, into which the screws *s* enter, and the screws *t* hold in the stile *g*. The extended portion (marked *v*) of the straps of the hinges *h* between the screws *t* and the pivots *w* is made elastically flexible horizontally, but is stiff vertically. The bearings *x* of the pivots *w* are fastened by screws *y* to the front casing *d*, as shown in Fig. 4. The elastic portions *v* of the hinges *h* are made tapering in width, with the greater breadth at the place where they are attached to the stile *g* and front *n* of the door *c* by the screws *t*, and are of such proportions that the flexure of the plates is as nearly uniform as may be throughout these parts, the object of the tapering form being to distribute the flexure evenly in the plates and avoid permanent bending or set at any point, thereby impairing the elasticity of the hinge-plates. The distance between the pivots *w* of the hinges *h* and the point of attachment to the door *c* is such as to provide ample elasticity to the hinges and at the same time operates to leave the doorway unobstructed by the thickness of the door *e* when opened at right angles to the frame *b*.

In applying the door and frame to a door-opening for use the frame is placed in the door-opening in the wall with the casing *d* overlapping on the outer surface of the wall. The frame is then strained or twisted as may be required to contact the casing *d* of the frame with the rim 1 on the door. Strips 27 are then applied closely to the inner edge of the frame and fastened to the wall in close contact therewith, and other strips 28 are fastened to the wall in close contact therewith and with the outer edges of the casing *d*.

The latch 2 is applied to the side of the door *e* opposite the hinges *h*, at or near the mid-length of the door, and engages a keeper 3, secured to the casing *d*.

As a consequence of the torsional flexible qualities of the door and frame and the means of continuously exerting elastic pressure at the hinges and the lock without any special attention such doors remain air-tight continuously with a minimum of strain and labor. The door in closing by its weight and motion acquires considerable momentum. This is greatest near the latch, and as it is arrested is expended first in latching and in compressing the gasket *o* and flexing the straps of the hinges *h*. Then the elastic reaction on the hinges makes a constant closing pressure on the gasket and permanently seals the closed door.

It is obvious that the frames and doors can be made as described and sold separately, as may also the hinges and latch, and afterward assembled and put to use. All of these parts are of novel and useful construction and adapted to coöperate with each other, but are separately salable, and therefore are made the subject of separate and distinct applications for Letters Patent.

Having described my invention and the operation thereof, what I claim is—

1. A door for air-tight compartments consisting of rigid stiles united by rails susceptible of torsion, a flexible inner sheathing, a flexible outer sheathing having a rim projecting beyond the stiles and rails, and a compressible gasket secured to said projecting rim on the door, in combination with elastic hinges and a latch; said hinges and latch being so proportioned as to exert equal pressure upon the gasket in all parts between the rim of the door and a casing surrounding the door-opening, as set forth.

2. In a door for air-tight compartments, rigid stiles united by rails susceptible of torsion, and a flexible inner sheathing attached to said stiles and rails, in combination with a flexible outer sheathing also secured to said stiles and rails, and provided with a rim projecting beyond the stiles and rails, adapted to overlap and by flexure apply closely to the casing of the door-opening, substantially as set forth.

3. The combination with a door provided with a gasket; of a door frame and casing arranged to be adjustably applied to the door opening of a refrigerating chamber, and consisting of jambs, lintel and sill edgewise rigid, but susceptible of torsional flexure; and a casing secured to said frame and adapted to contact with the gasket on said door, substantially as set forth.

4. In a frame for doors of air-tight compartments, stiles and a lintel and a sill rigid in lengthwise direction and torsionally flexible, in combination with a torsionally-flexible casing attached to the front of said frame and adapted to be adjusted by torsion to fit deviations from a flat plane of a door applied thereto, substantially as set forth.

5. In a combined air-tight door and frame for refrigerating and like chambers, a door having rigid stiles, rails connecting with said stiles, susceptible of torsional flexure, an inner sheathing susceptible of torsional flexure, an outer sheathing projecting beyond the stiles and rails, also torsionally flexible, and a frame having all parts rigid in the direction of their depth, a casing secured to said frame, a gasket applied to said outer sheathing to contact with said casing, in combination with elastic hinges; and, a latch, proportioned and arranged to press said door upon said gasket uniformly in all parts against said casing, with continuous pressure, as and for the purpose set forth.

6. The combination with a door frame casing liable to variably deviate from a flat plane; of a door arranged to be rigid edgewise and having torsionally-flexible faces; and elastic hinges and fasteners arranged to apply the door edges in contact with said frame, substantially as set forth.

7. A torsionally-flexible door provided with a gasket; in combination with flexible resilient hinges and fasteners arranged to convert the momentum of the door in closing into a constant elastic force to maintain pressure upon said gasket, substantially as set forth.

8. A door-way frame, a flexible door fitted to overlap the front margin of said frame, elastic hinges applied to the edge of said door, an automatic fastening applied to the opposite edge of the door, and arranged to elastically enforce contact between the margin of the frame and the margin of the door, substantially as set forth.

9. A torsionally-flexible door for air-tight apartments, formed of rigid stiles and rails, an inner and outer torsionally-flexible sheathing secured thereto, said outer sheathing projecting as a rim beyond the stiles and rails and provided with a compressible gasket adapted to contact closely with the casing of a door-frame, substantially as set forth.

10. A door frame, having rigid edges and a torsionally-flexible casing, in combination with a door having an edgewise-rigid margin, and torsionally-flexible faces, one of which faces overlaps the face of the casing, and a gasket applied to said overlapping face, substantially as set forth.

11. A door having an edgewise rigid margin, and flexible faces, one of which faces projects beyond said margin, in combination with a gasket applied to said projecting face, and elastic hinges attached to said door adapted to elastically connect the door with a door frame, substantially as set forth.

12. A door having an edgewise rigid margin and flexible faces, one of which faces projects beyond said margin, and a gasket applied to said projecting face; in combination with a locking-latch adapted to automatically engage a keeper and hold the gasket under compression against a door-frame casing, substantially as set forth.

13. A frame for doors of air-tight inclosures embracing torsionally-flexible jambs and a lintel rigid in lengthwise direction adapted to be adjustably applied to an opening in a wall, and a casing attached to the front of said frame adapted to support the bearings of extending hinges, as shown and described.

14. A frame for doors of air-tight compartments embracing a lintel a sill and torsionally-flexible jambs, and a broad front casing adapted to support extended hinges arranged to swing the door clear of the lintel of the door way opening, when opened at right angles, substantially as set forth.

15. In a frame for doors of air-tight compartments, stiles and a lintel, a sill rigid in lengthwise direction and torsionally flexible, in combination with a torsionally flexible casing attached to the front of said frame, and adapted to be adjusted by torsion to fit deviations from a flat plane of the wall to which it is applied, substantially as set forth.

In witness whereof I have hereunto set my hand in the presence of two subscribing witnesses.

S. PRICE STEVENSON.

Witnesses:
IRA STOVER MYERS,
S. HORACE MYERS.

Correction in Reissue Letters Patent No. 12,717.

It is hereby certified that in Reissue Letters Patent No. 12,717, granted November 12, 1907, upon the application of S Price Stevenson, of Chester, Pennsylvania, for an improvement in "Doors and Frames Therefor for Opening and Closing Air-Tight Chambers," an error appears in the printed specification requiring correction, as follows: In line 131, page 2, the word "lintel" should read *line;* and that the proper corrections have been made in the files and records of the Patent Office, and are hereby made in said Letters Patent.

Signed and sealed this 14th day of April, A. D., 1908.

[SEAL.] C. C. BILLINGS,

*Acting Commissioner of Patents.*